(12) United States Patent
Mazoue

(10) Patent No.: US 9,268,801 B2
(45) Date of Patent: Feb. 23, 2016

(54) AUTOMATIC FILE STRUCTURE AND FIELD DATA TYPE DETECTION

(71) Applicant: Didier Mazoue, Issy les Moulineaux (FR)

(72) Inventor: Didier Mazoue, Issy les Moulineaux (FR)

(73) Assignee: Business Objects Software Ltd., Dublin (IE)

( * ) Notice: Subject to any disclaimer, the term of this patent is extended or adjusted under 35 U.S.C. 154(b) by 361 days.

(21) Appl. No.: 13/792,690

(22) Filed: Mar. 11, 2013

(65) Prior Publication Data
US 2014/0258341 A1    Sep. 11, 2014

(51) Int. Cl.
*G06F 17/30* (2006.01)
(52) U.S. Cl.
CPC ................ *G06F 17/30292* (2013.01)

(58) Field of Classification Search
None
See application file for complete search history.

(56) References Cited

U.S. PATENT DOCUMENTS

| | | | |
|---|---|---|---|
| 8,051,060 B1* | 11/2011 | Vo et al. | 707/705 |
| 2004/0254919 A1* | 12/2004 | Giuseppini | 707/3 |
| 2011/0153667 A1* | 6/2011 | Parmenter et al. | 707/780 |

* cited by examiner

*Primary Examiner* — Anh Tai Tran
(74) *Attorney, Agent, or Firm* — Fish & Richardson P.C.

(57) ABSTRACT

Methods, systems, and computer-readable storage media for determining data structure and field types of a data source that is to be processed by an application. Actions include receiving the data source, providing base data associated with the data source, determining a number of fields of the data source and, for each field, a field type based on the data source and the base data, generating data structure data, the data structure data comprising the number of fields and field types, and providing the data structure data to the application.

15 Claims, 5 Drawing Sheets

AUTOMATIC FILE STRUCTURE AND FIELD DATA TYPE DETECTION

BACKGROUND

To assist enterprise operations, data can be analyzed and/or manipulated. For example, business intelligence users may access and read data in order to perform analytics and/or data manipulation. In enterprise settings, such as a corporation, data sources may already have a defined data structure (e.g., defined by an information technology (IT) group within the enterprise) as well as business definitions. In some instances, an IT group within the enterprise can provide sufficient information to make a data source understandable and consumable. In some instances, a data source can be self-descriptive (e.g., such as an online analytical processing (OLAP) data source).

In some instances, however, insufficient information is available to make a data source readily consumable. For example, an external data source (e.g., outside of the enterprise) might not be sufficiently self-descriptive. Consequently, applications within the enterprise may need to be instructed as to the structure of the data source. For example, an application can prompt a user for additional information regarding the data source, requiring the user to be a priori knowledgeable about the data source.

SUMMARY

Implementations of the present disclosure include computer-implemented methods for determining data structure and field types of a data source that is to be processed by an application. In some implementations, actions include receiving the data source, providing base data associated with the data source, determining a number of fields of the data source and, for each field, a field type based on the data source and the base data, generating data structure data, the data structure data comprising the number of fields and field types, and providing the data structure data to the application.

In some implementations, determining a number of fields of the data source includes: selecting a field separator from a plurality of field separators, and, for each sample row in a set of sample rows, determining an estimated number of fields based on the field separator.

In some implementations, determining a number of fields of the data source further includes determining that the estimated number of fields for each sample row is equal across all sample rows in the set of sample rows, the number of fields being equal to the estimated number of fields.

In some implementations, determining a number of fields of the data source further includes determining that the estimated number of fields for each sample row is unequal across two or more sample rows in the set of sample rows, and in response selecting a second field separator from the plurality of field separators, for each sample row in the set of sample rows, determining an estimated number of fields based on the second field separator, and determining that the estimated number of fields for each sample row is equal across all sample rows in the set of sample rows, the number of fields being equal to the estimated number of fields.

In some implementations, determining a number of fields of the data source further includes iterating over all separators in the plurality of separators and determining that, for each separator, the estimated number of fields for each sample row is unequal across two or more sample rows in the set of sample rows, and in response, setting the number of fields equal to one.

In some implementations, the set of sample rows includes first n rows of data within the data source, where n is an integer that is greater than or equal to two.

In some implementations, determining, for each field, a field type includes determining that data provided in the field corresponds to a date and time format of a plurality of date and time formats, and in response setting the field type to date and time.

In some implementations, determining, for each field, a field type includes determining that data provided in the field corresponds to a numeric format of a plurality of numeric formats, and in response setting the field type to numeric.

In some implementations, determining that data provided in the field corresponds to a numeric format of a plurality of numeric formats is performed in response to determining that the data provided in the field does not correspond to any date and time formats of a plurality of date and time formats.

In some implementations, actions further include determining that a field includes a string field type.

In some implementations, determining that a field includes a string field type is performed in response to determining that the data provided in the field does not correspond to any date and time formats of a plurality of date and time formats and to determining that the data provided in the field does not correspond to any numeric formats of a plurality of numeric formats.

In some implementations, the base data includes a type of the data source.

In some implementations, the data source includes a computer-readable file and the base data includes a suffix of the computer-readable file.

In some implementations, the base data includes regional settings.

In some implementations, the regional settings include one or more of a regional language, numeric formats, and date and time formats.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to automatically determining relevant information regarding a data source that is to be consumed by an application. In some implementations, relevant information for the data source can be determined without requiring user input. More particularly, implementations of the present disclosure enable automatic detection of data structure and field types of the data source to enable one or more applications to consume the data source (e.g., without prompting a user for additional information). In accordance with implementations of the present disclosure, a data source is read and a data source structure is detected to define the number of fields in the data source, to define the data type of each field, and/or to define the field names. In some implementations, an output is provided that includes sufficient information to enable the data source to be consumed by an application (e.g., a business intelligence application). In some examples, data sources can include text files, comma-separated values (CSV) files, web pages, word processing files, clipboard files, etc.

Figure 1:
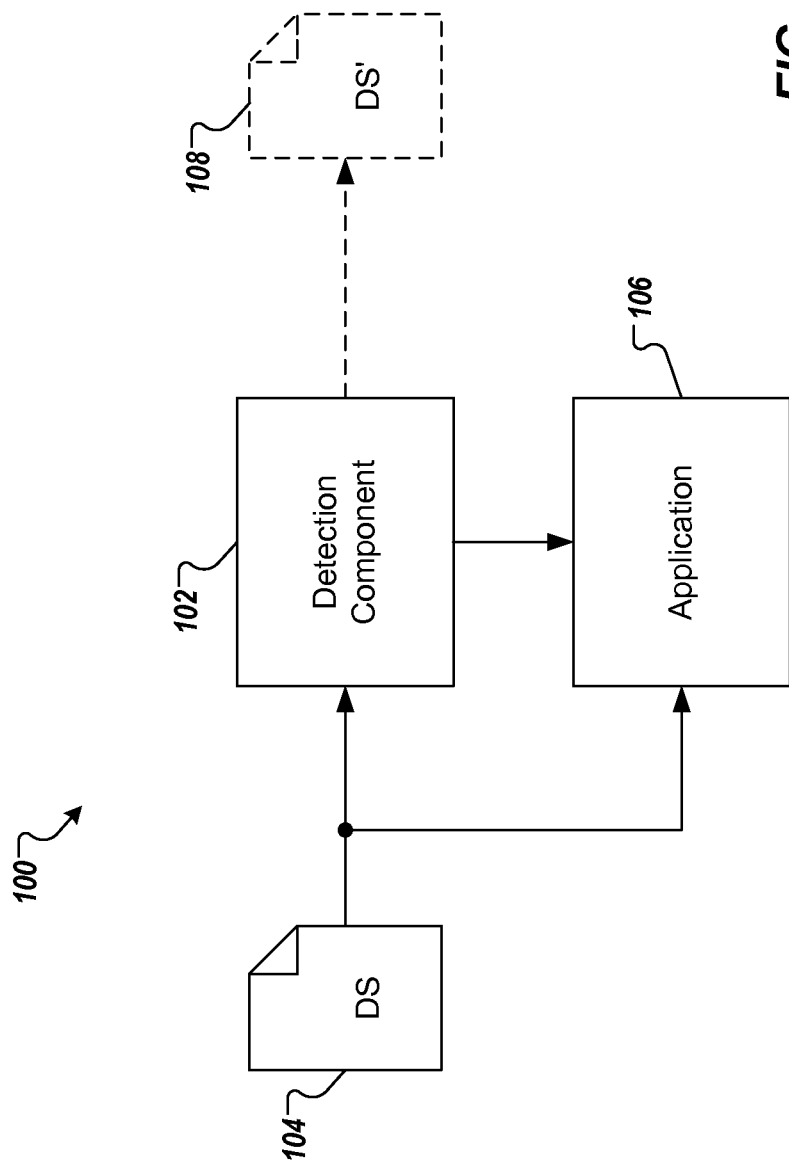
FIG. 1 depicts an example implementation of the present disclosure.

FIG. 1 depicts an example implementation of the present disclosure. In the depicted example, an example architecture 100 includes a detection component 102, which receives a data source (DS) 104, and an application 106. In some examples, the architecture 100 can also include a modified data source (DS') 108. In some implementations, the detection component 102 processes the DS 104 to provide output to the application 106, as discussed in further detail herein. In some implementations, the detection component 102 processes the DS 104 to provide the modified DS' 108. In some examples, the modified DS' 108 includes the DS 104 appended with meta-data, the meta-data providing the detected data structure information associated with the DS 104.

In some examples, a structure of the DS 104 is unknown. In some examples, the DS 104 can be provided to both the detection component 102 and to the application 106. The detection component 102 receives the DS 104 and processes the DS 104 to identify its structure. In some examples, determining the structure of the DS 104 includes determining the number of fields in the data source, determining the data type of each field, identifying field names, and/or determining other appropriate information. The detection component 102 provides output to the application 106. In some examples, the application 106 receives the DS 104 and the output, such that the application 106 can consume the DS 104. In some examples, the output includes sufficient information (e.g., the number of fields in the DS 104, data type of each field, and/or field names) to enable the DS 104 to be consumed by the application 106.

In some examples, the application 106 includes a business intelligence application, data artisan tools, extract, transform and load (ETL) tools, and/or query and analysis tools. In some examples, the application 106 uses a data source multiple times. In some examples, the detection component 102 can process the DS 104 once to determine the data structure information, and the application 106 and/or other applications (not shown) can use the data source multiple times. For example, the detection component 102 can append a metafile to each unstructured data to provide the DS' 108. The application 106 and/or other applications can process the DS' 108 one or more times, without the detection component 102 re-processing the original DS 104 for each consumption.

In accordance with implementations of the present disclosure, data sources (e.g., the DS 104) are processed (e.g., by the detection component 102) to determine the structure of each data source. In some implementations, one or more operations can be performed to determine the number of fields in the data source. For example, to determine the number of fields, the data source can be read and processed. In some implementations, a suffix of the data source (e.g., .txt, .csv, .xls*, .doc*, .ppt*, etc) is determined and can be used to determine the number of fields. In some implementations, one or more rows (n rows) of the data source are analyzed, where n is an integer that is greater than or equal to two, and is less than the total number of rows in the data source. In some implementations, n can be set by default to any arbitrary positive integer (e.g., 10). In some examples, the first n rows of the data source are processed to determine the number of fields.

In some implementations, detecting the number of fields further includes identifying matching field separators. In some implementations, various field separators can be tested. In some examples, the field separators to be tested can be determined based on the suffix of the data source. For example, for a data source with a .csv suffix, the an initially tested field separator can include a double-quote. In some implementations, determining the number of fields includes an iterative approach to identify the matching field separators. In some examples, one or more field separators of a list of field separators can be iteratively tested, and the iterations can cease when the number of fields found is equal for each tested row. In some examples, the list of field separators includes tab, comma, semi-comma, space, slash, back-slash, semi-colon, dash, underscore, dot and other similar field separators. In some implementations, if no field separators have been correctly identified, the number of fields for the data source is set equal to one (1) and the field separator is defined as {none}. In some implementations, determining the number of fields can include a manual change of the field separator. That is, for example, a user can manually edit the list of field separators that are to be tested, and the data source can be re-processed to take into account the edited list of field separators. Within the context example, manual changes introduced by the user can be identified by the detection component (DS 102) and the data source (DS 104) can be reanalyzed by the detection component (DS 102).

In some implementations, data type for each field is determined. The data type for a field can be determined as one of a plurality of example data types. Example data types can include date/time data type, numeric data type and string data type. In some implementations, an iterative process is used to determine the data type for each field. In some implementations, if it is determined that the data type does not match either date/time or numeric data types, it is determined that the particular field is a string data type.

In some implementations, a percentage (e.g., 10%) of the rows included in the data source are processed to determine the data types of the fields. The percentage of rows can define a random selection of the rows to be processed. In some examples, the percentage of rows is parameterized and can be changed manually adjusted by a user. In some examples, a number of example rows (k rows) can be randomly selected from the data source for analysis. For example, k rows can be analyzed, where k is an integer that is greater than or equal to two, and is less than the total number of rows of the data source. In some examples, each row of the k rows is processed once, keeping in memory the rows that have already been analyzed. In some implementations, the first row is not considered when determining the data types, because the first row can include field names. Determining field names is discussed in further detail below.

In some implementations, to determine the data type of a field, each field value is parsed. In some examples, each field value is parsed randomly. Because the fields values can be formatted based on regional settings, the detection component 102 determines the regional settings. In some examples, regional settings can include numeric settings, language, and date/time formats. Example numeric settings can include type of decimal point (e.g., dot versus comma), type of thousands separator (e.g., comma versus dot) and currency symbol (e.g., $, £, ¥, etc.). Example date/time formats can include: yyyy/MM/dd, yyyyMMdd, yyyy/dd/MM, yyyy/d/M, MM/dd/yyyy, M/d/yyyy, MM/yyyy/dd, M/yyyy/d, dd/MM/yyyy, d/M/yyyy, dd/yyyy/MM, d/yyyy/M, yyyy-MM-dd, yyyy-dd-MM, yyyy-d-M, yyyy-M-D, MM-dd-yyyy, dd-MM-yyyy, HH:mm:ss, dd MMM yyyy, dd MMMM yyyy, and other appropriate formats.

In some implementations, a default can include determining the regional settings as the regional settings of a computing device that is executing an application (e.g., the application 106). In some implementations, the regional language can be manually changed by a user and can be used during the identification of the data types. In some implementations, one or more of the numeric settings, the language and the date/time format can be manually entered by a user. In some examples, respective options panels can be provided, through which the user can provide manual input.

In some implementations, whether the data type of a particular field is date/time can initially be determined. In some examples, if the data type of the particular field cannot be determined as date/time, it can be determined whether the data type of the particular field is numeric. In some examples, if the data type of the particular field cannot be determined as numeric, the data type of the particular field is determined to be string.

In some implementations, to determine whether the data type of a particular field is date/time, the field value is parsed. In some examples, the field value is parsed randomly. The field value is compared to multiple date/time formats. If a match is found, the particular field is identified as a date/time data type of the matching format. This is repeated for the same field (same field position) for each of the sample rows (k rows). If all of the corresponding fields of the sample rows are of the same data type, the data type for the corresponding fields of all of the rows in the data source are determined to be date/time. If all date/time formats, provided by the application, were tested and the corresponding fields of the sample rows are not of the same date/time format, it is can be determined whether the data type is numeric.

In some implementations, to determine whether the data type of a particular field is numeric, the field value is parsed. In some examples, the field value is parsed randomly. The field value processed in view of the numeric settings. If all values in the particular field are numeric (e.g., a number and/or a numeric setting), the data type for the particular field is determined to be numeric. This is repeated for the same field (same field position) for each of the sample rows (k rows). If all of the corresponding fields of the sample rows are of the same data type, the data type for the corresponding fields of all of the rows in the data source are determined to be numeric. If all of the corresponding fields of the sample rows are not of the same data type, it is determined that the data type for the corresponding fields of all of the rows in the data source is string.

In some implementations, field names of the fields of the rows can be determined. In some implementations, the first row of the data source is analyzed to determine whether the first row contains field names. In some examples, the data type associated with a field (e.g., determined as discussed above) is compared to the field value of a corresponding field of the first row. If for example, the data type associated with a field is date/time or numeric, but the field value of the corresponding field of the first row does not correspond (e.g., is string), it can be determined that the first row includes field names.

In some examples, all field data types can be provided as strings. Consequently, it cannot be determined whether the first row includes field names. In some examples, at least one field (of the k sample rows) includes a numeric or date/time data type. Consequently, it can be determined whether the data type of a corresponding field of the first row is also numeric or date/time, respectively. If the data type of the corresponding field of the first row is determined to be different (e.g., neither numeric nor date/time), it is determined that the first row contains field names. In some examples, if at least one data type for a field of the first row is different from the data type of the same field for the rest of the rows, then the first row contains the field names. In some examples, it can be determined that the first row does not contain the field names or the data types are identical for the same field for all rows. Consequently, a generic field name (e.g., "Column") can be inserted and can be followed by an increment (e.g., Column 1, Column 2, . . . , Column n).

Figure 2:
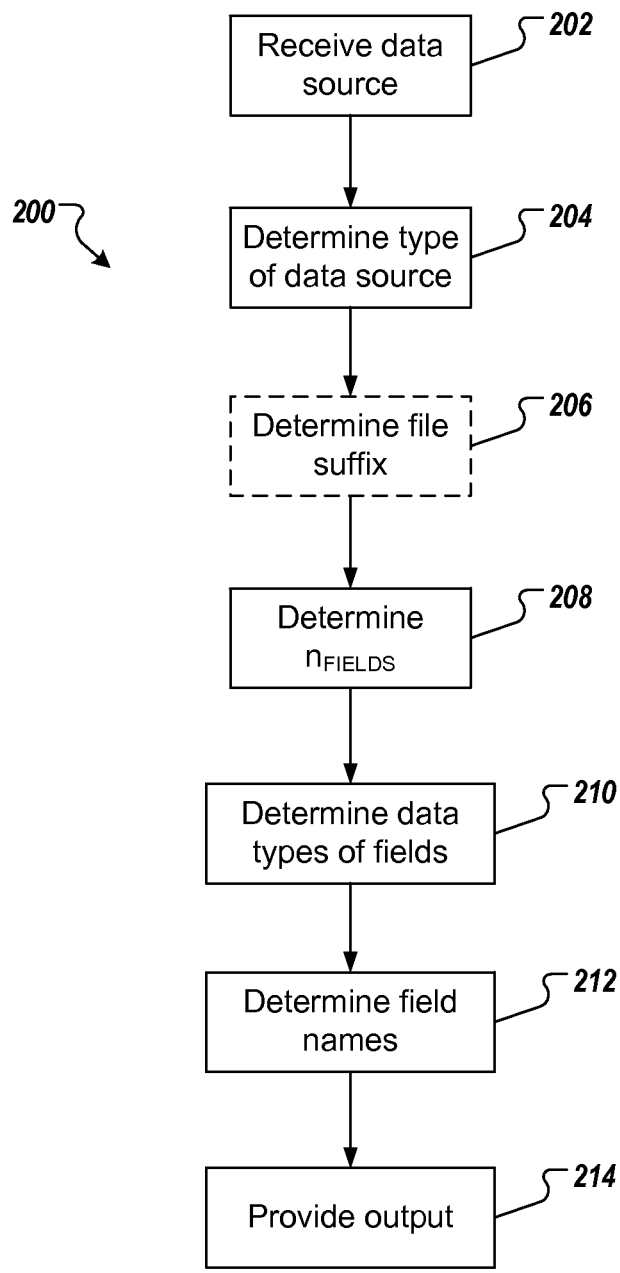
FIG. 2 depicts an example process in accordance with implementations of the present disclosure.

FIG. 2 depicts an example process 200 in accordance with implementations of the present disclosure. In some examples, the example process 200 can be provided by one or more computer-executable programs executed using one or more computing devices (e.g., detection component 102 described with reference to FIG. 1). In some implementations, the example process 200 is performed to provide automatic detection of data structure and field types of a data source.

The data source is received by the detection component (202). The type of data source is determined (204). In some implementations, the automatic detection of data structure includes determining the file suffix (206). For example, the detection component can use the data source suffix to retrieve information about the structure of the data source.

The number of fields ($n_{FIELDS}$) in each row of the data source is determined (208). The data type of each field the rows of the data source are determined (210). The field names in the data source are determined (212). The output of the automatic detection of data structure and field types of a data source is provided (214). In some examples, the detection component can provide the output of the automatic detection process to an application (e.g., application 106 in FIG. 1). In some examples, the detection component can provide the output of the automatic detection process (e.g., append the output as meta-data to the original data source (e.g., the DS 104 of FIG. 1) to provide a modified data source (e.g., the DS' 108 of FIG. 1).

Figure 3:
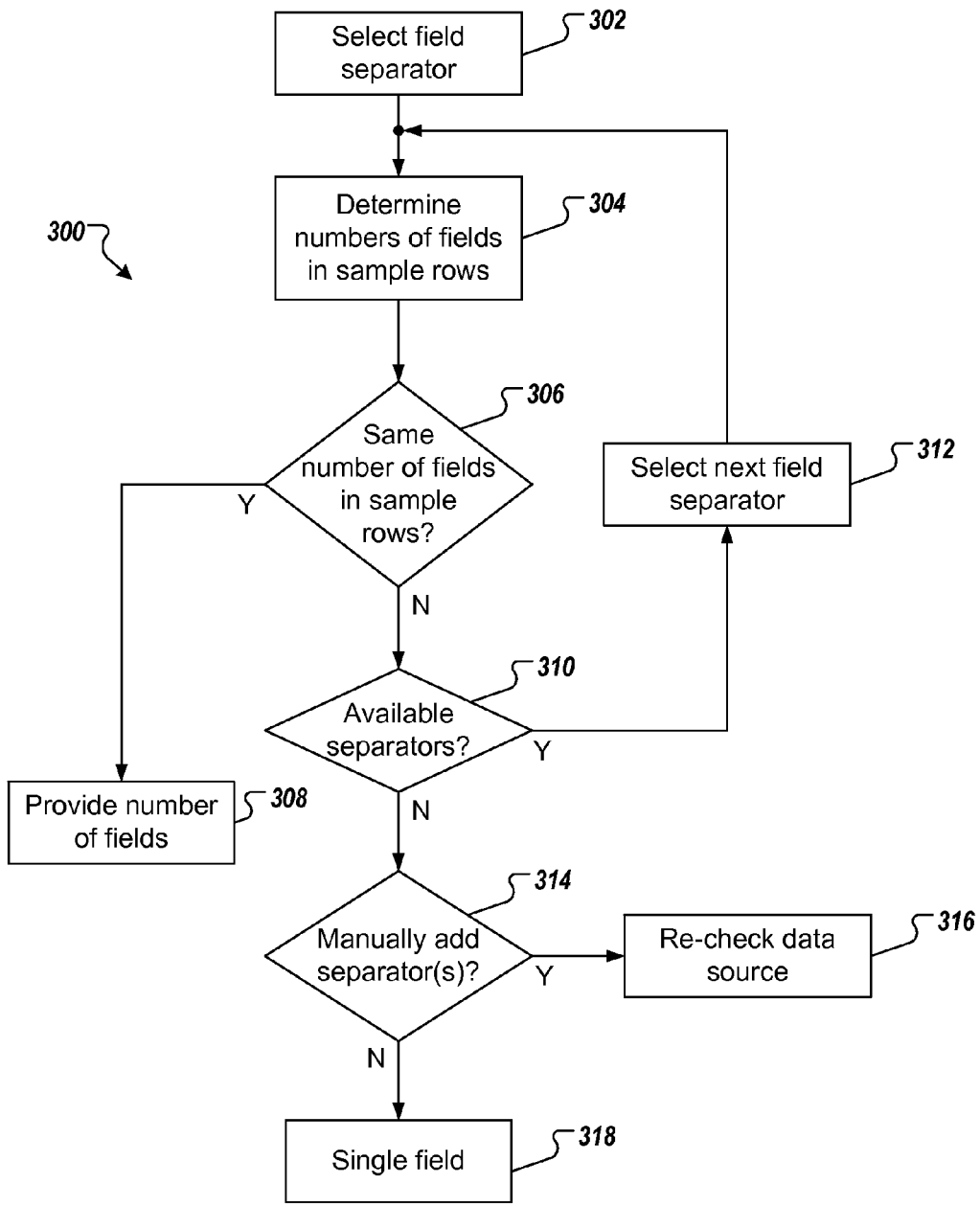
FIG. 3 depicts an example process in accordance with implementations of the present disclosure.

FIG. 3 depicts an example process 300 in accordance with implementations of the present disclosure. In some examples, the example process 300 can be provided by one or more computer-executable programs executed using one or more computing devices. In some implementations, the example process 300 is performed to determine a number of fields within a data source.

For example, a sample k rows (k=5) of the data source can be provided as:

$$\begin{pmatrix} F_{11}; F_{12}; \ldots F_{1n_1} \\ F_{21}; F_{22}; \ldots F_{2n_2} \\ F_{31}; F_{32}; \ldots F_{3n_3} \\ F_{41}; F_{42}; \ldots F_{4n_4} \\ F_{51}; F_{52}; \ldots F_{5n_5} \end{pmatrix}.$$

A first field separator can be selected (302). The number of fields in each of the sample rows is determined (304). More particularly, the selected field separator is used to determine the number of fields in each row of the sample rows. It is determined whether the numbers of fields in the sample rows are equal (306). For example, and in view of the sample rows provided above (e.g., the first five rows in the data source), if the selected field separator includes a comma (e.g., ","), the numbers of fields across the sample rows may be unequal. As another example, and in view of the sample k rows provided above, if the selected field separator includes a semi-colon (e.g., ";"), the numbers of fields across the sample rows is equal (e.g., $n_1=n_2=n_3=n_4=n_5$).

If the number of fields for each sample row is equal across all sample rows in the set of sample rows, the selected field separator matches the data source and the number of fields is provided (308). Within the context example, if the number of fields in sample rows is equal, $n_1=n_2=n_3=n_4=n_5=n$ If the number of fields in the sample rows is unequal across two or more sample rows in the set of sample rows, the selected field separator is not the appropriate field separator. In some implementations, if the number of fields in the sample rows is unequal, it is determined whether other separators are available (310). In some examples, if other separators are available, a next field separator (e.g., in a list of field separators) is selected (312) and the process 300 loops back to determine the number of fields in the sample rows. If other field separators are not available, it is determined whether field separators are to be manually added (314). If field separators are manually added, the data source can be re-checked based on the added field separator(s) (316). If field separators are not to be manually added, the data source is provided as a single field (318). That is, the number of fields is set equal to one (1).

Figure 4:
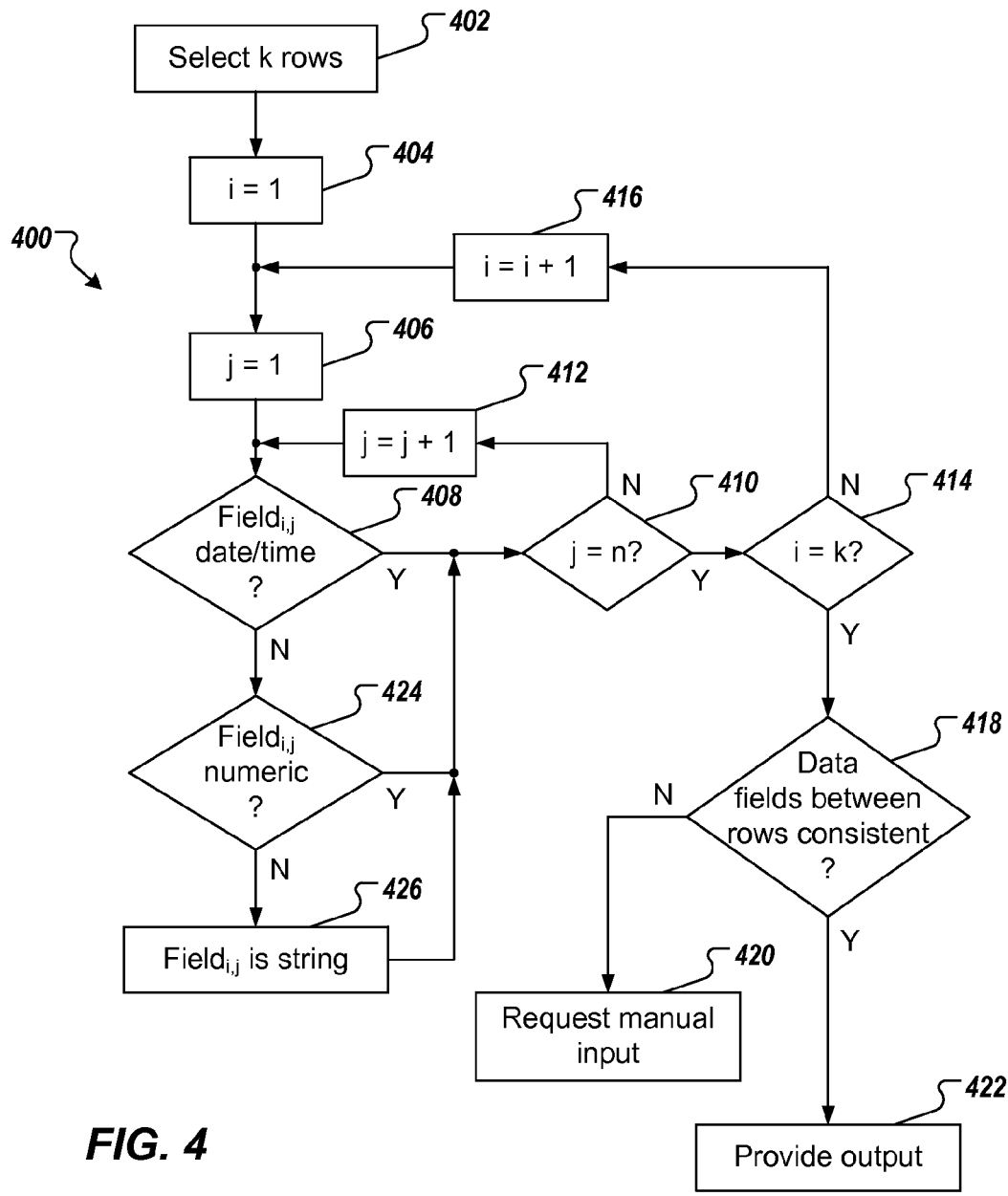
FIG. 4 depicts an example process in accordance with implementations of the present disclosure.

FIG. 4 depicts an example process 400 in accordance with implementations of the present disclosure. In some examples, the example process 400 can be provided by one or more computer-executable programs executed using one or more computing devices. In some implementations, the example process 400 is performed to determine field data types within a data source.

A sample number of rows (k rows) are selected (402). For example the data source can include a number m (e.g., thousands) of rows, and the sample number of rows can include a percentage of the total number of rows (e.g., 10%). In some examples, rows provided in the sample number of rows are randomly selected.

A counter i, corresponding to the row number, is set equal to 1 (404). A counter j, corresponding to the field number (or column), is set equal to 1 (406). It is determined whether the $\text{Field}_{i,j}$ (e.g., in row i and column j) is of a date/time data type (408). If $\text{Field}_{i,j}$ is a date/time data type, it is determined whether j is equal to n (e.g., whether all fields in row i have been checked for data type) (410). If the field in row i and column j ($\text{Field}_{i,j}$) does not have a date/time data type, it is determined whether $\text{Field}_{i,j}$ has a numeric data type (424). If the field in row i and column j ($\text{Field}_{i,j}$) has a numeric data type, it is determined whether j is equal to n (e.g., whether all fields in row i have been checked for data type) (410). If the field in row i and column j ($\text{Field}_{i,j}$) does not have a numeric data type, the data type of $\text{Field}_{i,j}$ is set to string (426), and it is determined whether j is equal to n (e.g., whether all fields in row i have been checked for data type) (410).

If j is not equal to n (more fields of the row are to be checked), j is incremented (412) and the process 400 loops back. If j is equal to n, it is determined whether i is equal to k (whether all of the sample rows have been checked) (414). If i is not equal to k, i is incremented (416) and the process 400 loops back. If j is equal to n and i is equal to k, that the data type for all fields of the sample rows have been checked and, it is determined whether the data types for the corresponding data fields between rows are consistent (418). If data types for the corresponding data fields between rows are not consistent, manual input can be requested (420). In some implementations, the manual input can include a change of regional settings (e.g., thousands, decimal, currency, etc.). In some implementations, the manual input can include additional date/time formats. If data types for the corresponding data fields between rows are consistent, output is provided (422). In some examples, the output provides the data type for each field of all rows in the data source.

Figure 5:
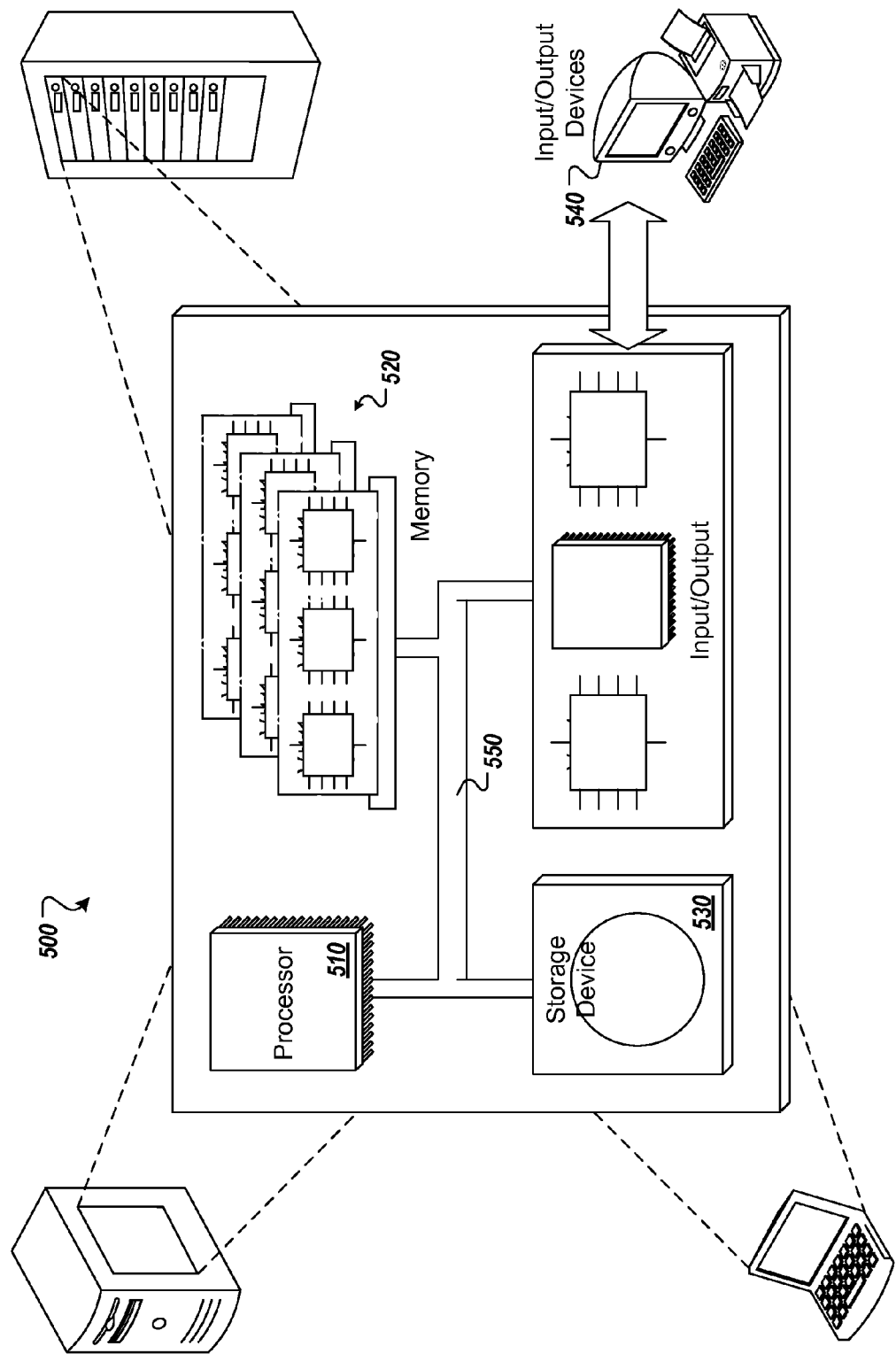
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for determining data structure and field types of a data source that is to be processed by an application, the method being executed using one or more processors and comprising:
   receiving the data source;
   providing base data associated with the data source;
   determining, by the one or more processors, a number of fields of the data source and, for each field, a field type based on the data source and the base data, wherein determining the number of fields of the data source comprises:
      selecting a field separator from a plurality of field separators;
      for each sample row in a set of sample rows, determining an estimated number of fields based on the field separator; and
      iterating over all separators in the plurality of field separators and determining that, for each field separator, the estimated number of fields for each sample row is unequal across two or more sample rows in the set of sample rows, and in response, setting the number of fields equal to one;
   generating, by the one or more processors, data structure data, the data structure data comprising the number of fields and field types; and
   providing, by the one or more processors, the data structure data to the application.

2. The method of claim 1, wherein determining the number of fields of the data source further comprises determining that the estimated number of fields for each sample row is equal across all sample rows in the set of sample rows, the number of fields being equal to the estimated number of fields.

3. The method of claim 1, wherein determining the number of fields of the data source further comprises:
   determining that the estimated number of fields for each sample row is unequal across two or more sample rows in the set of sample rows, and in response:
      selecting a second field separator from the plurality of field separators;
      for each sample row in the set of sample rows, determining an estimated number of fields based on the second field separator; and
      determining that the estimated number of fields for each sample row is equal across all sample rows in the set of sample rows, the number of fields being equal to the estimated number of fields.

4. The method of claim 1, wherein the set of sample rows comprises first n rows of data within the data source, where n is an integer that is greater than or equal to two.

5. The method of claim 1, wherein determining, for each field, a field type comprises determining that data provided in the field corresponds to a date and time format of a plurality of date and time formats, and in response setting the field type to date and time.

6. The method of claim 1, wherein determining, for each field, a field type comprises determining that data provided in the field corresponds to a numeric format of a plurality of numeric formats, and in response setting the field type to numeric.

7. The method of claim 6, wherein determining that data provided in the field corresponds to a numeric format of a plurality of numeric formats is performed in response to determining that the data provided in the field does not correspond to any date and time formats of a plurality of date and time formats.

8. The method of claim 1, further comprising determining that a field includes a string field type.

9. The method of claim 8, wherein determining that a field includes a string field type is performed in response to determining that the data provided in the field does not correspond to any date and time formats of a plurality of date and time formats and to determining that the data provided in the field does not correspond to any numeric formats of a plurality of numeric formats.

10. The method of claim 1, wherein the base data comprises a type of the data source.

11. The method of claim 10, wherein the data source comprises a computer-readable file and the base data comprises a suffix of the computer-readable file.

12. The method of claim 1, wherein the base data comprises regional settings.

13. The method of claim 12, where the regional settings comprise one or more of a regional language, numeric formats, and date and time formats.

14. A non-transitory computer-readable storage medium coupled to one or more processors and having instructions stored thereon which, when executed by the one or more processors, cause the one or more processors to perform operations for determining data structure and field types of a data source that is to be processed by an application, the operations comprising:

receiving the data source;

providing base data associated with the data source;

determining a number of fields of the data source and, for each field, a field type based on the data source and the base data, wherein determining the number of fields of the data source comprises:

selecting a field separator from a plurality of field separators;

for each sample row in a set of sample rows, determining an estimated number of fields based on the field separator; and iterating over all separators in the plurality of field separators and determining that, for each field separator, the estimated number of fields for each sample row is unequal across two or more sample rows in the set of sample rows, and in response, setting the number of fields equal to one;

generating data structure data, the data structure data comprising the number of fields and field types; and providing the data structure data to the application.

15. A system, comprising:

a computing device including at least one processor; and a non-transitory computer-readable storage device coupled to the at least one processor and having instructions stored thereon which, when executed by the at least one processor, cause the at least one processor to perform operations for determining data structure and field types of a data source that is to be processed by an application, the operations comprising:

receiving the data source;

providing base data associated with the data source;

determining a number of fields of the data source and, for each field, a field type based on the data source and the base data, wherein determining the number of fields of the data source comprises:

selecting a field separator from a plurality of field separators;

for each sample row in a set of sample rows, determining an estimated number of fields based on the field separator; and iterating over all separators in the plurality of field separators and determining that, for each field separator, the estimated number of fields for each sample row is unequal across two or more sample rows in the set of sample rows, and in response, setting the number of fields equal to one;

generating data structure data, the data structure data comprising the number of fields and field types; and providing the data structure data to the application.

\* \* \* \* \*